US009540470B2

(12) United States Patent
Matsuda et al.

(10) Patent No.: US 9,540,470 B2
(45) Date of Patent: Jan. 10, 2017

(54) COPOLYMER, TREATMENT AGENT FOR PAPER, AND TREATED PAPER

(75) Inventors: Michio Matsuda, Settsu (JP); Tetsuya Uehara, Settsu (JP); Norimasa Uesugi, Settsu (JP); Ikuo Yamamoto, Settsu (JP); Kayo Kusumi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 114 days.

(21) Appl. No.: 13/390,758

(22) PCT Filed: Aug. 17, 2010

(86) PCT No.: PCT/JP2010/063851
§ 371 (c)(1),
(2), (4) Date: Feb. 16, 2012

(87) PCT Pub. No.: WO2011/021619
PCT Pub. Date: Feb. 24, 2011

(65) Prior Publication Data
US 2012/0180969 A1    Jul. 19, 2012

(30) Foreign Application Priority Data
Aug. 18, 2009   (JP) ................. 2009-189110

(51) Int. Cl.
| | | |
|---|---|---|
| C08F 220/34 | (2006.01) | |
| C08F 226/10 | (2006.01) | |
| D21H 17/42 | (2006.01) | |
| D21H 17/37 | (2006.01) | |
| D21H 17/54 | (2006.01) | |
| C08F 220/24 | (2006.01) | |
| C08K 5/55 | (2006.01) | |
| D21H 21/16 | (2006.01) | |
| C08F 220/06 | (2006.01) | |
| C08F 226/06 | (2006.01) | |

(52) U.S. Cl.
CPC ........... *C08F 220/34* (2013.01); *C08F 220/24* (2013.01); *C08F 226/10* (2013.01); *C08K 5/55* (2013.01); *D21H 17/37* (2013.01); *D21H 17/375* (2013.01); *D21H 17/42* (2013.01); *D21H 17/54* (2013.01); *D21H 21/16* (2013.01); *C08F 220/06* (2013.01); *C08F 226/06* (2013.01)

(58) Field of Classification Search
CPC ................................................ C08F 226/10
USPC .................. 526/245, 248, 258, 312
See application file for complete search history.

(56) References Cited

U.S. PATENT DOCUMENTS

| | | | |
|---|---|---|---|
| 4,127,711 A | 11/1978 | Lore et al. | |
| 4,366,299 A | 12/1982 | Dessaint | |
| 5,247,008 A | 9/1993 | Michels et al. | |
| 5,439,999 A * | 8/1995 | Archer et al. | 526/278 |
| 5,558,940 A | 9/1996 | Michels et al. | |
| 6,465,591 B1 * | 10/2002 | Lee | 526/264 |
| 6,518,380 B2 * | 2/2003 | Juhue et al. | 526/245 |
| 2005/0234205 A1 | 10/2005 | Yamaguchi et al. | |
| 2006/0205864 A1 * | 9/2006 | Yamamoto | C08F 220/24 524/544 |
| 2007/0173148 A1 * | 7/2007 | Yamamoto et al. | 442/94 |
| 2009/0017321 A1 * | 1/2009 | Huang et al. | 428/511 |
| 2009/0155600 A1 | 6/2009 | Usugaya et al. | |

FOREIGN PATENT DOCUMENTS

| | | |
|---|---|---|
| CN | 101273171 A | 9/2008 |
| JP | 56-131612 A | 10/1981 |

(Continued)

OTHER PUBLICATIONS

Federal Register (FR vol. 68, No. 73/Apr. 16, 2003 [FRL-2303-8]), (http://www.epa.gov.opptintr/pfoa/pfoafr.pdf); pp. 18626-18633.

(Continued)

*Primary Examiner* — Nicole M Buie-Hatcher
(74) *Attorney, Agent, or Firm* — Sughrue Mion, PLLC

(57) ABSTRACT

Disclosed is a treatment agent for paper comprising a fluorine-containing copolymer having a repeat unit (a) derived from a fluorine-containing monomer represented by general formula (I): $CH_2=C(-X)-C(=O)-Y-[-CH_2)_m-Z-]_p-(CH_2)_n-Rf$; a repeat unit (b) derived from at least one amino monomer represented by general formula (II-1):

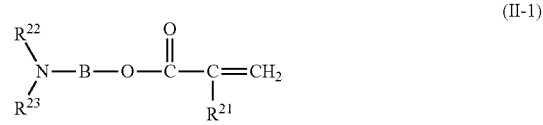

or a derivative thereof; and a repeat unit (c) derived from a pyrrolidone monomer represented by general formula (III):

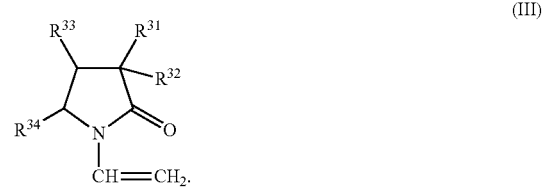

The treatment agent for paper provides paper having high oil resistance and high water resistance.

14 Claims, 1 Drawing Sheet

(56) References Cited

FOREIGN PATENT DOCUMENTS

| | | |
|---|---|---|
| JP | 8-059751 A | 3/1996 |
| JP | 10-310767 A | 11/1998 |
| WO | WO 03/106519 A1 | 12/2003 |
| WO | 2005090423 A1 | 9/2005 |
| WO | WO 2008022985 A1 * | 2/2008 |

OTHER PUBLICATIONS

EPA Environmental News, for Release: Monday Apr. 14, 2003, EPA Intensifies Scientific Investigation of a Chemical Processing Aid, (http://www.epa.gov/opptintr/pfoa/pfoaprs.pdf), 2 pages.
EPA Oppt Fact Sheet, Apr. 14, 2003, (http://www.epa.gov/opptintr/pfoa/pfoafacts.pdf), 3 pages.
"Preliminary Risk Assessment of the Developmental Toxicity Associated with Exposure to Perfluorooctanoic Acid and its Salts"; U.S. Environmental Protection Agency Office of Pollution Prevention and Toxics Risk Assessment Division; Apr. 10, 2003 (http://www.epa.gov/opptintr/pfoa/pfoara.pdf).

* cited by examiner

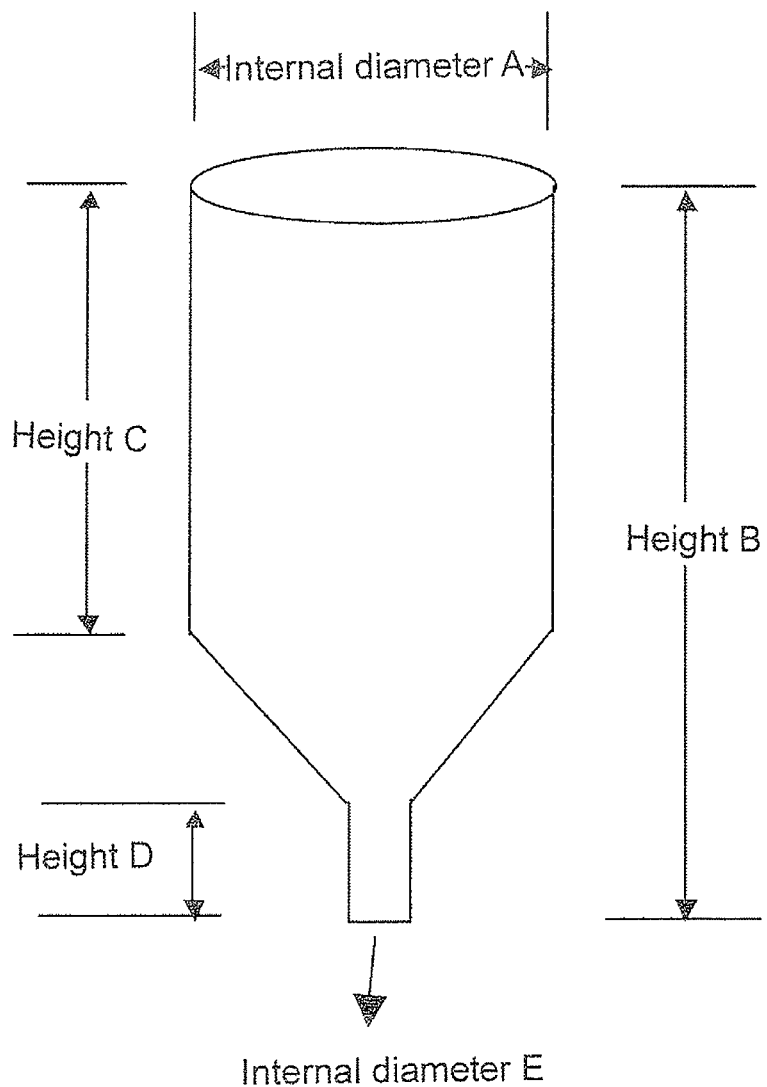

COPOLYMER, TREATMENT AGENT FOR PAPER, AND TREATED PAPER

CROSS REFERENCE TO RELATED APPLICATIONS

This application is a National Stage of International Application No. PCT/JP2010/063851 filed Aug. 17, 2010, claiming priority based on Japanese Patent Application No. 2009-189110, filed Aug. 18, 2009, the contents of all of which are incorporated herein by reference in their entirety.

TECHNICAL FIELD

The present invention relates to a novel copolymer and a treatment agent for paper comprising said copolymer, and paper treated with said treatment agent for paper.

BACKGROUND ART

Hitherto, various fluorine-containing polymer compounds are proposed. The fluorine-containing polymer compounds have the advantageous effects of having properties excellent in heat resistance, oxidation resistance, weather resistance and the like. The fluorine-containing polymer compounds are used as, for example, a water- and oil-repellent agent and a soil release agent by utilizing the properties that the fluorine-containing polymer compounds have low free energy, i.e., difficulty in adherence.

Recently, with respect to compounds containing a Rf group having 8 carbon atoms prepared by telomerization, Federal Register (FR Vol. 68, No. 73/Apr. 16, 2003 [FRL-7303-8]) (http://www.epa.gov/opptintr/pfoa/pfoafr.pdf), EPA Environmental News for release Monday Apr. 14, 2003 "EPA INTENSIFIES SCIENTIFIC INVESTIGATION OF A CHEMICAL PROCESSING AID" (http://www.epa.gov/opptintr/pfoa/pfoaprs.pdf), and
EPA OPPT FACT SHEET Apr. 14, 2003 (http://www.epa.gov/opptintr/pfoa/pfoafacts.pdf)
announced that a "telomer" may possibly metabolize or decompose to perfluorooctanoic acid (hereinafter abbreviated as "PFOA").

EPA (Environmental Protection Agency of USA) has announced that the EPA intensifies the scientific investigation on PFOA (cf. EPA Report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)).

Patent Document 1 (U.S. Pat. No. 4,366,299) discloses a fluorine-containing polymer, but the polymer is not dispersed in water. Patent Document 4 (U.S. Pat. No. 4,127,711) discloses a fluorine-containing polymer which is dispersed in water. Patent Document 5 (U.S. Pat. No. 5,247,008) discloses a fluorine-containing polymer comprising a fluorine-containing monomer, a nitrogen-containing monomer and an alkylene oxide group-containing monomer. In technologies of Patent Documents 1, 4 and 5, the number of carbon atoms in the Rf group of the fluorine-containing monomer is generally at least 8. A fluorine-containing monomer having the Rf group containing 1 to 6 carbon atoms is not sufficiently utilized in industry.

Patent Document 3 (International publication WO2005/090423) discloses that a copolymer, which is based on a fluorine monomer: $CH_2=CH-C(=O)-O-(CH_2)_2-(CF_2)_nF$ wherein the number of carbon atoms (n) of the Rf group is 1 to 6, and an amino-monomer and a polyethylene glycol monomer as comonomers, is used as soil release agent of the paper use is disclosed, but the specification, including Examples, is silent on a monomer having a vinyl pyrrolidone skeleton.

Patent Document 2 (International publication WO2003/106519) discloses a copolymer, which is based on a fluorine monomer of $CH_2=CH-C(=O)-O-(CH_2)_2-(CF_2)_nF$ wherein the number (n) of carbon atoms of the Rf group is 4, and an amino-monomer and a pyrrolidone monomer as comonomers, but Examples thereof do not describe the fluorine monomers wherein number (n) of carbon atoms in the Rf group is 6.

Hitherto, a copolymer, which is based on a fluorine monomer $CH_2=CH-C(=O)-O-(CH_2)_2-(CF_2)_nF$ wherein the number of carbon atoms (n) in the Rf group is 1 to 6, and an amino-monomer and a pyrrolidone monomer as comonomers, has not been described nor suggested.

The fluorine-containing polymers described in these Patent Documents cannot impart enough oil-resistance and water-repellency.

Patent Document 1: U.S. Pat. No. 4,366,299
Patent Document 2: International publication WO2003/106519
Patent Document 3: International publication WO2005/090423
Patent Document 4: U.S. Pat. No. 4,127,711
Patent Document 5: U.S. Pat. No. 5,247,008

SUMMARY OF THE INVENTION

Problems to be Solved by the Invention

An object of the invention is to provide an oil- and water-resistant agent composition based on a fluorine monomer wherein the number of carbon atoms (n) of the Rf group is 1 to 6, which can impart excellent oil-resistance and water-resistance to paper.

DISCLOSURE OF THE INVENTION

Problems to be Solved by the Invention

The present invention relates to a fluorine-containing copolymer, comprising
(a) repeating units derived from a fluorine-containing monomer of the general formula:

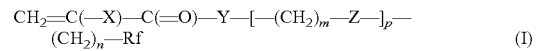

(I)

wherein X is a hydrogen atom, a methyl group, a fluorine atom, a chlorine atom, a bromine atom, an iodine atom, a $CFX^1X^2$ group (wherein $X^1$ and $X^2$ are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
Y is —O— or —NH—;
Z is a direct bond, —S— or —$SO_2$—;
Rf is a fluoroalkyl group having 1 to 6 carbon atoms;
m is from 1 to 10, n is from 0 to 10, and p is 0 or 1;
(b) repeating units derived from at least one amino-monomer of the general formula:

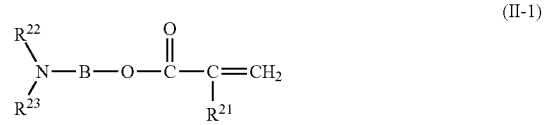

(II-1)

-continued

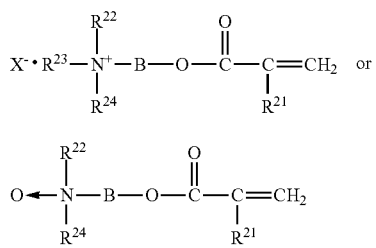
(II-2)

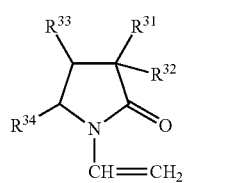
(II-3)

wherein B is a linear or branch alkylene group having 1 to 4 carbon atoms,
$R^{21}$ is a hydrogen atom or an alkyl group having 1 to 4 carbon atoms,
$R^{22}$, $R^{23}$ and $R^{24}$ each is, the same or different, a hydrogen atom, a linear or branched alkyl group having 1 to 18 carbon atoms, or a hydroxyethyl group or a benzyl group, or $R^{22}$ and $R^{23}$ are taken together to form a divalent organic group having 2 to 30 carbon atoms, and
$X^{-}$ is an anion group; and
(c) repeating units derived from a pyrrolidone monomer of the general formula:

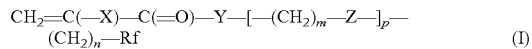
(III)

wherein $R^{31}$, $R^{32}$, $R^{33}$ and $R^{34}$ each is, the same or different, a hydrogen atom or an alkyl group having 1 to 4 carbon atoms.

The present invention also relates to a composition comprising a fluorine-containing copolymer, and water and/or an organic solvent.

The present invention further relates to a method of preparing said composition, comprising steps of:
(1) polymerizing a monomer mixture comprising a monomer of the formula (I), a monomer of the formula (II-1) or (II-2), and a monomer of the formula (III), in an organic solvent to give a solution of a polymer,
(2) removing the organic solvent from the solution of polymer, and adding water,
(3) optionally, adding an acid to convert an amino group in the polymer to an ammonium salt, and
(4) optionally, adding an oxidizing agent to convert the amino group in the polymer to an N-oxide group.

Effects of the Invention

The copolymer of the present invention can be easily dispersed in water.

High oil-resistance and water-resistance are given to paper treated with the copolymer of the present invention.

BRIEF DESCRIPTION OF DRAWINGS

FIG. 1 schematically shows a sedimentation tube used in a test of measuring the stability of an aqueous dispersion.

MODES FOR CARRYING OUT THE INVENTION

The fluorine-containing monomer (a) is of the general formula:

$$CH_2=C(-X)-C(=O)-Y-[-(CH_2)_m-Z-]_p-(CH_2)_n-Rf \quad (I)$$

wherein X is a hydrogen atom, a methyl group, a linear or branched alkyl group having 2 to 21 carbon atoms, a fluorine atom, a chlorine atom, a bromine atom, an iodine atom, a $CFX^1X^2$ group (wherein $X^1$ and $X^2$ are a hydrogen atom, a fluorine atom or a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group;
Y is —O— or —NH—;
Z is a direct bond, —S— or —$SO_2$—;
Rf is a fluoroalkyl group having 1 to 6 carbon atoms;
m is from 1 to 10, n is from 0 to 10, and p is 0 or 1.

In the general formula (I), p is preferably 0. Preferred example of X is a hydrogen atom.

Generally, the fluorine-containing monomer (a) has the Rf group which is a perfluoroalkyl group and/or a partially fluorinated fluoroalkyl group. The Rf group is preferably a perfluoroalkyl group. The number of carbon atoms in the Rf group is from 1 to 6, preferably 4, 5 or 6, particularly 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)CF_2CF_2CF_3$, and —$(CF_2)_5CF_3$.

The fluorine-containing monomer (a) may be used alone or in a mixture of at least two.

Examples of the fluorine-containing monomer (a) include the followings:
$CH_2=C(-X)-C(=O)-O-(CH_2)_m-S-(CH_2)_n-Rf$
$CH_2=C(-X)-C(=O)-O-(CH_2)_m-SO_2-(CH_2)_n-Rf$
$CH_2=C(-X)-C(=O)-O-(CH_2)_n-Rf$
$CH_2=C(-X)-C(=O)-NH-(CH_2)_n-Rf$
wherein X is a hydrogen atom, a methyl group, a fluorine atom, a chlorine atom, a bromine atom, an iodine atom, a $CFX^1X^2$ group (wherein $X^1$ and $X^2$ are a hydrogen atom, a fluorine atom or a chlorine atom), a cyano group, a linear or branched fluoroalkyl group having 1 to 20 carbon atoms, a substituted or unsubstituted benzyl group, or a substituted or unsubstituted phenyl group;
Rf is a fluoroalkyl group having 1 to 6 carbon atoms;
m is from 1 to 10, and n is from 0 to 10.

Examples of the fluorine-containing monomer (a) include the followings, to which the present invention is not limited.
$CH_2=C(-H)-C(=O)-O-(CH_2)_2-S-Rf$
$CH_2=C(-H)-C(=O)-O-(CH_2)_2-S-(CH_2)_2-Rf$
$CH_2=C(-H)-C(=O)-O-(CH_2)_3-SO_2-Rf$
$CH_2=C(-H)-C(=O)-O-(CH_2)_2-SO_2-(CH_2)_2-Rf$
$CH_2=C(-H)-C(=O)-O-(CH_2)_2-Rf$
$CH_2=C(-H)-C(=O)-NH-(CH_2)_2-Rf$
$CH_2=C(-H)-C(=O)-OCH_2CH_2N(C_2H_5)SO_2-Rf$
$CH_2=C(-H)-C(=O)-OCH_2CH_2N(CH_3)SO_2-Rf$
$CH_2=C(-H)-C(=O)-OCH_2CH(OCOCH_3)CH_2-Rf$
$CH_2=C(-CH_3)-C(=O)-O-(CH_2)_2-S-Rf$
$CH_2=C(-CH_3)-C(=O)-O-(CH_2)_2-S-(CH_2)_2-Rf$ $CH_2=C(-CH_3)-C(=O)-O-(CH_2)_3-SO_2-Rf$
$CH_2=C(-CH_3)-C(=O)-O-(CH_2)_2-SO_2-(CH_2)_2-Rf$
$CH_2=C(-CH_3)-C(=O)-O-(CH_2)_2-Rf$
$CH_2=C(-CH_3)-C(=O)-NH-(CH_2)_2-Rf$
$CH_2=C(-CH_3)-C(=O)-OCH_2CH_2N(C_2H_5)SO_2-Rf$
$CH_2=C(-CH_3)-C(=O)-OCH_2CH_2N(CH_3)SO_2-Rf$
$CH_2=C(-CH_3)-C(=O)-OCH_2CH(OCOCH_3)CH_2-Rf$
$CH_2=C(-F)-C(=O)-O-(CH_2)_2-S-Rf$
$CH_2=C(-F)-C(=O)-O-(CH_2)_2-S-(CH_2)_2-Rf$
$CH_2=C(-F)-C(=O)-O-(CH_2)_2-SO_2-Rf$
$CH_2=C(-F)-C(=O)-O-(CH_2)_2-SO_2-(CH_2)_2-Rf$
$CH_2=C(-F)-C(=O)-O-(CH_2)_2-Rf$
$CH_2=C(-F)-C(=O)-NH-(CH_2)_2-Rf$
$CH_2=C(-Cl)-C(=O)-O-(CH_2)_2-S-Rf$
$CH_2=C(-Cl)-C(=O)-O-(CH_2)_2-S-(CH_2)_2-Rf$
$CH_2=C(-Cl)-C(=O)-O-(CH_2)_2-SO_2-Rf$
$CH_2=C(-Cl)-C(=O)-O-(CH_2)_2-SO_2-(CH_2)_2-Rf$
$CH_2=C(-Cl)-C(=O)-O-(CH_2)_2-Rf$
$CH_2=C(-Cl)-C(=O)-NH-(CH_2)_2-Rf$
$CH_2=C(-CF_3)-C(=O)-O-(CH_2)_2-S-Rf$
$CH_2=C(-CF_3)-C(=O)-O-(CH_2)_2-S-(CH_2)_2-Rf$
$CH_2=C(-CF_3)-C(=O)-O-(CH_2)_2-SO_2-Rf$
$CH_2=C(-CF_3)-C(=O)-O-(CH_2)_2-SO_2-(CH_2)_2-Rf$
$CH_2=C(-CF_3)-C(=O)-O-(CH_2)_2-Rf$
$CH_2=C(-CF_3)-C(=O)-NH-(CH_2)_2-Rf$
$CH_2=C(-CF_2H)-C(=O)-O-(CH_2)_2-S-Rf$
$CH_2=C(-CF_2H)-C(=O)-O-(CH_2)_2-S-(CH_2)_2-Rf$
$CH_2=C(-CF_2H)-C(=O)-O-(CH_2)_2-SO_2-Rf$
$CH_2=C(-CF_2H)-C(=O)-O-(CH_2)_2-SO_2-(CH_2)_2-Rf$
$CH_2=C(-CF_2H)-C(=O)-O-(CH_2)_2-Rf$
$CH_2=C(-CF_2H)-C(=O)-NH-(CH_2)_2-Rf$
$CH_2=C(-CN)-C(=O)-O-(CH_2)_2-S-Rf$
$CH_2=C(-CN)-C(=O)-O-(CH_2)_2-S-(CH_2)_2-Rf$
$CH_2=C(-CN)-C(=O)-O-(CH_2)_2-SO_2-Rf$
$CH_2=C(-CN)-C(=O)-O-(CH_2)_2-SO_2-(CH_2)_2-Rf$
$CH_2=C(-CN)-C(=O)-O-(CH_2)_2-Rf$
$CH_2=C(-CN)-C(=O)-NH-(CH_2)_2-Rf$
$CH_2=C(-CF_2CF_3)-C(=O)-O-(CH_2)_2-S-Rf$
$CH_2=C(-CF_2CF_3)-C(=O)-O-(CH_2)_2-S-(CH_2)_2-Rf$
$CH_2=C(-CF_2CF_3)-C(=O)-O-(CH_2)_2-SO_2-Rf$
$CH_2=C(-CF_2CF_3)-C(=O)-O-(CH_2)_2-SO_2-(CH_2)_2-Rf$
$CH_2=C(-CF_2CF_3)-C(=O)-O-(CH_2)_2-Rf$
$CH_2=C(-CF_2CF_3)-C(=O)-NH-(CH_2)_2-Rf$
$CH_2=C(-F)-C(=O)-O-(CH_2)_3-S-Rf$
$CH_2=C(-F)-C(=O)-O-(CH_2)_3-S-(CH_2)_2-Rf$
$CH_2=C(-F)-C(=O)-O-(CH_2)_3-SO_2-Rf$
$CH_2=C(-F)-C(=O)-O-(CH_2)_3-SO_2-(CH_2)_2-Rf$
$CH_2=C(-F)-C(=O)-O-(CH_2)_3-Rf$
$CH_2=C(-F)-C(=O)-NH-(CH_2)_3-Rf$
$CH_2=C(-Cl)-C(=O)-O-(CH_2)_3-S-Rf$
$CH_2=C(-Cl)-C(=O)-O-(CH_2)_3-S-(CH_2)_2-Rf$
$CH_2=C(-Cl)-C(=O)-O-(CH_2)_3-SO_2-Rf$
$CH_2=C(-Cl)-C(=O)-O-(CH_2)_3-SO_2-(CH_2)_2-Rf$
$CH_2=C(-CF_3)-C(=O)-O-(CH_2)_3-S-Rf$
$CH_2=C(-CF_3)-C(=O)-O-(CH_2)_3-S-(CH_2)_2-Rf$
$CH_2=C(-CF_3)-C(=O)-O-(CH_2)_3-SO_2-Rf$
$CH_2=C(-CF_3)-C(=O)-O-(CH_2)_3-SO_2-(CH_2)_2-Rf$
$CH_2=C(-CF_2H)-C(=O)-O-(CH_2)_3-S-Rf$
$CH_2=C(-CF_2H)-C(=O)-O-(CH_2)_3-S-(CH_2)_2-Rf$
$CH_2=C(-CF_2H)-C(=O)-O-(CH_2)_3-SO_2-Rf$
$CH_2=C(-CF_2H)-C(=O)-O-(CH_2)_3-SO_2-(CH_2)_2-Rf$
$CH_2=C(-CN)-C(=O)-O-(CH_2)_3-S-Rf$
$CH_2=C(-CN)-C(=O)-O-(CH_2)_3-S-(CH_2)_2-Rf$
$CH_2=C(-CN)-C(=O)-O-(CH_2)_3-SO_2-Rf$
$CH_2=C(-CN)-C(=O)-O-(CH_2)_3-SO_2-(CH_2)_2-Rf$
$CH_2=C(-CF_2CF_3)-C(=O)-O-(CH_2)_3-S-Rf$
$CH_2=C(-CF_2CF_3)-C(=O)-O-(CH_2)_3-S-(CH_2)_2-Rf$
$CH_2=C(-CF_2CF_3)-C(=O)-O-(CH_2)_3-SO_2-Rf$
$CH_2=C(-CF_2CF_3)-C(=O)-O-(CH_2)_2-SO_2-(CH_2)_2-Rf$ wherein Rf is a fluoroalkyl group having 1 to 6 carbon atoms.

The amino monomer (b) is a compound having at least one nitrogen atom (particularly an amino group) and one carbon-carbon double bond. The amino monomer (b) is a compound of the general formula (II-1) wherein a nitrogen atom is not cationized, a compound of general formula (II-2) wherein a nitrogen atom in is cationized, or a N-oxide of the general formula (II-3). The amino monomer of the formula (II-1) is a (meth) acrylate which does not have a cationic group (and N-oxide group). The amino monomer of the formula (II-2) is a (meth) acrylate having a cationic group. The amino monomer of the formula (II-3) is a (meth) acrylate having an N-oxide group.

In the formula (II-1), $R^{22}$ and $R^{23}$ may be independently an alkyl group, or $R^{22}$ and $R^{23}$ may be taken together to form a divalent organic group (for example, a cycloalkyl amine group). The alkyl group is preferably a methyl group or an ethyl group.

There may be a quaternary ammonium base as the cationic group. In other words, in the formula (II-2), $R^{22}$, $R^{23}$ and $R^{24}$ may be independently an alkyl group, or $R^{22}$ and $R^{23}$ may be taken together to form a divalent organic group (for example, a cycloalkyl amine group) and $R^{24}$ may be an alkyl group. Preferably, the alkyl group is a methyl group or an ethyl group.

In the formula (II-1) to (II-3), the divalent organic group wherein $R^{22}$ and $R^{23}$ together form the divalent organic group is preferably a polymethylene group having at least 2 carbon atoms, a group wherein at least one hydrogen atom in said polymethylene group has been substituted, or a group wherein a ether oxygen atom has been inserted into a carbon-carbon bond of said polymethylene group. Preferably, a substituent substituting the hydrogen atom of the polymethylene group is an alkyl group such as a methyl group, an ethyl group or an n-propyl group. $R^{22}$ and $R^{23}$ may be together to bond to a nitrogen atom so as to form a morpholino group, a piperidino group, and a 1-pyrrolidinyl group.

X⁻ is a counter ion (an anion group). X may be a halogen atom or a group remaining after removing one cationic hydrogen atom removed from an acid (an inorganic acid or an organic acid). The examples of X⁻ include a chloride ion (Cl⁻), a bromide ion (Br⁻), an iodide ion (I⁻), a hydrogen sulfate ion ($HSO_4^-$) and an acetate ion ($CH_3COO^-$).

The examples of the amino monomer (b) (particularly an amino monomer of the formula (II-1)) include dimethylaminoethyl methacrylate, dimethylaminopropyl methacrylate, diethylaminoethyl methacrylate, diethylaminopropyl methacrylate, N-tert-butylaminoethyl methacrylate, dimethylaminoethyl acrylate, dimethylaminopropyl acrylate, diethylaminoethyl acrylate, diethylaminopropyl acrylate and N-tert-butylaminoethyl acrylate.

The repeating units in a polymer derived from the amino monomer (b) may be one type or at least two types. When the repeating units have at least two types, the repeating units desirably have two different types of an alkyl group portion or an counter ion.

Even if the drying for the short time is performed at low temperature after treating with the treatment agent, the incorporation of the amino monomer (b) imparts high water resistance and high oil-resistance to paper and also has the effect of improving the stability of the treatment agent.

Examples of the repeating units free from the cationic group derived from the amino monomer (b) include the followings:

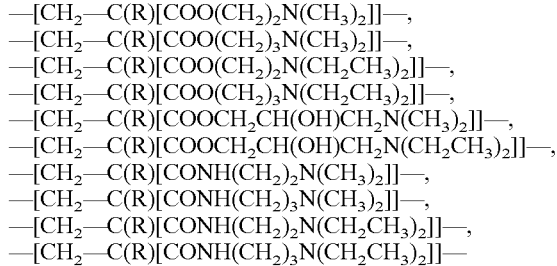

wherein, R is a hydrogen atom or an alkyl group having 1 to 4 carbon atoms.

Specific examples of the repeating units having the cationic group derived from the amino monomer (b) include the followings:

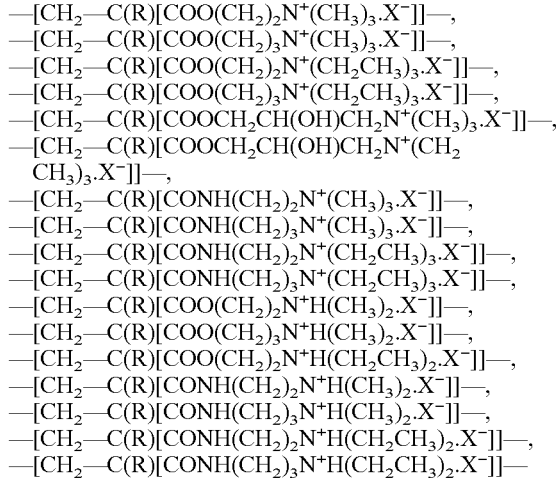

wherein R is a hydrogen atom or an alkyl group having 1 to 4 carbon atoms, and X— is an anion group.

The repeating units (II-2) having an ammonium salt can be produced by reacting the repeating units (II-1) having an amino group with acid. Examples of the acid include an inorganic acid (for example, hydrogen halide (such as hydrochloric acid, hydrogen bromide and hydrogen iodide), sulfuric acid, nitric acid) and an organic acid (for example, formic acid and acetic acid). The addition amount of the acid may have a lower limit of 10 equivalent %, for example, 20 equivalent %, particularly 50 equivalent % and an upper limit of 200 equivalent %, for example, 100 equivalent %, particularly 80 equivalent %, based on 1 equivalent of the amino group in the repeating units (II-1) having an amino group.

The repeating units (II-3) having an N-oxide group can be produced by oxidizing the repeating units (II-1) having an amino group with an oxidizing agent. Examples of the oxidizing agent include percarboxylic acids, such as hydrogen peroxide, persulfuric acid and meta-chloroperbenzoic acid. The addition amount of the oxidizing agent has a lower limit of 5 equivalent %, for example, 10 equivalent % and an upper limit of 100 equivalent %, for example, 50 equivalent %, based on 1 equivalent of the amino group in the repeating units (II-1) having an amino group.

It is preferable to modify the amino group of the repeating units (b) derived from the amino monomer to an ammonium salt (cationization) or an N-oxide group (oxidation). Preferably, the repeating units (b) derived from the amino monomer contains any of:
(i) an ammonium salt,
(ii) an N-oxide, or
(iii) a combination of the ammonium salt and the N-oxide.

In the repeating units (b), the equivalent ratio of salt (i), oxide (ii) and combination (iii) may be at least 5 equivalent %, for example, at least 20 equivalent %, especially at least 50 equivalent, based on the whole of repeating units (b). The equivalent ratio of salt (i), oxide (ii) and combination (iii) may have an upper limit of 200 equivalent %, for example, 150 equivalent %, particularly 95 equivalent %.

In the combination (iii), the equivalent ratio of the ammonium salt to the N-oxide may be 1:99 to 99:1, for example, 1:9 to 9:1.

The pyrrolidone monomer (c) is a compound having a pyrrolidone group and one carbon-carbon double bond. Preferably, in the formula (III), $R^{31}$, $R^{32}$, $R^{33}$ and $R^{34}$ each is a hydrogen atom or a methyl group. Examples of the pyrrolidone monomer (c) include N-vinyl-2-pyrrolidone, N-vinyl-3-methyl-2-pyrrolidone, N-vinyl-4-methyl-2-pyrrolidone, N-vinyl-5-methyl-2-pyrrolidone, and N-vinyl-3,3-dimethyl-2-pyrrolidone.

An other monomer (d) may have, for example, 2 to 20 carbon atoms. The other monomer (d) may be a monomer having an anionic functional group. The monomer having an anionic functional group is a compound having an anionic functional group and one carbon-carbon double bond. Examples of the anionic functional group are —C(=O)OH, —$SO_3H$ and —$SO_3Na$. Examples of the monomer (d) include acrylic acid, methacrylic acid, sodium styrene-sulfonate, itaconic acid, and fumaric acid.

The other monomer (d) may be a monomer other than the monomer having an anionic functional group. The following are mentioned as such other monomer: ethylene, vinyl acetate, vinyl chloride, vinyl fluoride, vinyl halide, styrene, alpha-methylstyrene, p-methylstyrene, polyoxyalkylene mono-(meth)acrylate, (meth)acrylamide, diacetone (meth)acrylamide, methylolated (meth)acrylamide, N-methylol (meth)acrylamide, alkyl vinyl ether, alkyl vinyl ether halide, alkyl vinyl ketone, butadiene, isoprene, chloroprene, glycidyl (meth)acrylate, 2-hydroxyethyl (meth)acrylate, aziridinyl (meth)acrylate, benzyl (meth)acrylate, isocyanatoethyl (meth)acrylate, cyclohexyl (meth)acrylate, short-chain alkyl (meth)acrylate, maleic anhydride, (meth)acrylate having a polydimethylsiloxane group, N-vinylcarbazole, etc.

The fluorine-containing copolymer contains 100 parts by weight of the fluorine-containing monomer (a). Preferably, the amount of the repeating units (b) is 0.1 to 30 parts by weight, for example, 1 or 5 to 30 parts by weight, particularly 5 or 10 to 25 parts by weight,
the amount of the repeating units (c) is 0.1 to 30 parts by weight, for example, 1 or 2 to 15 parts by weight, particularly 2 to 7 parts by weight, and
the amount of the repeating units (d) is 20 parts by weight or less, for example, 0 to 15 parts by weight, particularly 1 to 10 parts by weight,
based on 100 parts by weight of repeating units (a).

The number-average molecular weight of the copolymer of the present invention may be from 1,000 to 1,000,000, preferably from 5,000 to 500,000. The molecular weight is measured by a gel permeation chromatography in terms of polystyrene.

A polymerization method of producing the copolymer of the present invention is not limited. Various polymerization methods such as a bulk polymerization, a solution polymerization, an emulsion polymerization and a radiation polymerization can be selected. For example, a solution polymerization using an organic solvent and an emulsion polymerization using water or both an organic solvent and water are generally selected. A treatment liquid is produced by diluting a reaction mixture with water or adding an emulsifying agent to make the emulsification in water after the polymerization.

In the present invention, preferably, after the polymerization (for example, the solution polymerization or the emulsion polymerization), a solvent is removed and water is added to disperse the polymer in water.

Examples of the organic solvent include ketones such as acetone and methyl ethyl ketone; esters such as ethyl acetate and methyl acetate; glycols such as propylene glycol, dipropylene glycol monomethyl ether, N-methyl-2-pyrrolidone (NMP), dipropylene glycol, tripropylene glycol and low molecular weight polyethylene glycol; and alcohols such as ethyl alcohol and isopropanol.

As the emulsifying agent for the emulsion polymerization and for emulsification in water by adding the emulsifying agent after polymerization, various conventional emulsifying agents such as an anionic emulsifying agent, a cationic emulsifying agent and a nonionic emulsifying agent can be used.

As the polymerization initiator, for example, a peroxide, an azo compound or a persulfuric acid-based compound can be used. The polymerization initiator is generally water-soluble and/or oil-soluble.

Specific examples of the oil-soluble polymerization initiator are preferably 2,2'-azobis(2-methylpropionitrile), 2,2'-azobis(2-methylbutyronitrile), 2,2'-azobis(2,4-dimethylvaleronitrile), 2,2'-azobis(2,4-dimethyl-4-methoxyvaleronitrile), 1,1'-azobis(cyclohexane-1-carbonitrile), dimethyl 2,2'-azobis(2-methylpropionate), 2,2'-azobis(2-isobutyronitrile), benzoyl peroxide, di-tertiary-butyl peroxide, lauryl peroxide, cumene hydroperoxide, t-butyl peroxypivalate, diisopropyl peroxydicarbonate, and t-butyl perpivalate.

Specific examples of the water-soluble polymerization initiator are preferably 2,2'-azobisisobutylamidine dihydrochloride, 2,2'-azobis(2-methyl-propionamidine) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-imidazolin-2-yl)propane] hydrochloride, potassium persulfate, barium persulfate, ammonium persulfate, and hydrogen peroxide.

The polymerization initiator is preferably an organic peroxide wherein a temperature having a half life of ten hours is at least 40° C. The polymerization initiator is particularly preferably t-butyl peroxypivalate.

The polymerization initiator is used in an amount within a range from 0.01 to 5 parts by weight, based on 100 parts by weight of the monomer.

For the purpose of adjusting the molecular weight, a chain transfer agent, for example, a mercapto group-containing compound may be used. Specific examples thereof include 2-mercaptoethanol, thiopropionic acid, and alkyl mercaptan. The mercapto group-containing compound may be used in an amount of at most 10 parts by weight, within a range from 0.01 to 5 parts by weight, based on 100 parts by weight of the monomer.

Specifically, a copolymer can be produced in the following manner.

In a solution polymerization, it is possible to employ a method of dissolving a monomer in an organic solvent, replacing the atmosphere by nitrogen, adding a polymerization initiator and stirring the solution with heating at a temperature within a range from 40° C. to 120° C. for 1 hour to 10 hours. The polymerization initiator generally may be an oil-soluble polymerization initiator.

The organic solvent is inert to the monomer(s) and dissolves the monomer(s), and examples thereof include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane, trichlorotrifluoroethane, N-methyl-2-pyrrolidone (NMP) and dipropyleneglycol monomethyl ether (DPM). The organic solvent may be used in the amount within the range from 50 to 2,000 parts by weight, for example, from 50 to 1,000 parts by weight, based on 100 parts by weight of total of the monomers.

In an emulsion polymerization, there can be used a method of emulsifying monomers in water in the presence of an emulsifying agent, replacing the atmosphere by nitrogen, and polymerizing with stirring, for example, at the temperature within the range from 40° C. to 80° C. for 1 hour to 10 hours. As the polymerization initiator, for example, water-soluble initiators (e.g., benzoyl peroxide, lauroyl peroxide, t-butyl perbenzoate, 1-hydroxycyclohexyl hydroperoxide, 3-carboxypropionyl peroxide, acetyl peroxide, azobisisobutylamidine dihydrochloride, azobisisobutyronitrile, sodium peroxide, potassium persulfate and ammonium persulfate) and oil-soluble initiators (e.g., azobisisobutyronitrile, benzoyl peroxide, di-tert-butyl peroxide, lauryl peroxide, cumene hydroperoxide, t-butyl peroxypivalate and diisopropyl peroxydicarbonate) are used. The polymerization initiator may be used in the amount within the range from 0.01 to 10 parts by weight based on 100 parts by weight of the monomers.

In order to obtain a polymer dispersion in water, which is superior in storage stability, it is desirable that the monomers are emulsified in water by using an emulsifying device capable of applying a strong shearing energy (e.g., a high-pressure homogenizer and an ultrasonic homogenizer) and then polymerized with using the oil-soluble polymerization initiator. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. An anionic and/or cationic and/or nonionic emulsifying agent is preferably used. When the monomers are not completely compatibilized, a compatibilizing agent (e.g., a water-soluble organic solvent and a low-molecular weight monomer) capable of sufficiently compatibilizing them is preferably added to these monomers. By the addition of the compatibilizing agent, the emulsifiability and polymerizability can be improved.

Examples of the water-soluble organic solvent include acetone, methyl ethyl ketone, ethyl acetate, propylene glycol, dipropylene glycol monomethyl ether (DPM), dipropylene glycol, tripropylene glycol, ethanol, N-methyl-2-pyrrolidone (NMP), 3-methoxy-3-methyl-1-butanol and isoprene glycol. The water-soluble organic solvent may be used in the amount within the range from 1 to 50 parts by weight, e.g., from 10 to 40 parts by weight, based on 100 parts by weight of water. The addition of NMP, DPM, 3-methoxy-3-methyl-1-butanol or isoprene glycol improves the stability of the composition (particularly an emulsion) (The preferable addition amount is, for example, 1 to 20% by weight, particularly 3 to 10% by weight, based on the composition). Examples of the low-molecular weight monomer include methyl methacrylate, glycidyl methacrylate and 2,2,2-trifluoroethyl methacrylate. The low-molecular weight monomer may be used in the amount within the range from 1 to 50 parts by weight, e.g., from 10 to 40 parts by weight, based on 100 parts by weight of water.

The treatment agent of the present invention is preferably in the form of a solution, an emulsion or an aerosol. The treatment agent generally comprises the fluorine-containing copolymer and a medium (particularly a liquid medium, for example, an organic solvent and/or water). The concentration of the fluorine-containing copolymer in the treatment agent may be, for example, from 0.01 to 50% by weight.

The treatment agent (or the composition) of the present invention can be produced by the following steps.
(1) step of polymerizing, in an organic solvent, a monomer comprising an amino monomer of the formula (II-1) to give a solution of a polymer,
(2) step of, optionally, removing the organic solvent from the solution of the polymer and adding water,
(3) step of, optionally, adding an acid to convert an amino group in the polymer into an ammonium salt, and
(4) step of, optionally, performing a treatment with an aqueous solution of hydrogen peroxide.

The removal of the organic solvent in the solution of the polymer can be performed by heating the polymer solution (preferably under reduced pressure) (to, for example, at least 60° C., such as 80 to 120° C.). The amount of water added may be, for example, 0.1 to 20 parts by weight, based on 1 part by weight of the polymer.

The amino group is converted into an N-oxide group by the treatment step (4) with the aqueous solution of hydrogen peroxide.

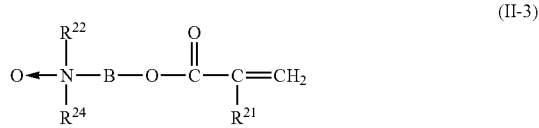

(II-3)

wherein B is a linear or branch alkylene group having 1 to 4 carbon atoms,
$R^{21}$ is a hydrogen atom or an alkyl group having 1 to 4 carbon atoms,
$R^{22}$, $R^{23}$ and $R^{24}$ each is, the same or different, a hydrogen atom, a linear or branched alkyl group having 1 to 18 carbon atoms, or a hydroxyethyl group or a benzyl group, or $R^{22}$ and $R^{23}$ are taken together to form a divalent organic group having 2 to 30 carbon atoms, and
$X^-$ is an anion group.

The amount of hydrogen peroxide is preferably 0.1 to 10% by weight, more preferably 0.3 to 3% by weight, based on the total weight of the monomer.

The treatment agent of the present invention can be used to treat (for example, surface-treat) paper.

The treatment agent of the present invention can be applied to a substrate to be treated by a know procedure. Usually, the treatment agent is diluted or dispersed with an organic solvent or water, is adhered to surfaces of the substrate by a well-known procedure such as an immersion coating, a spray coating and a foam coating, and is dried (surface treatment). For example, the fluorine-containing copolymer may be used so that, in the case of surface treatment, a fluorine atom ratio is 0.01 to 0.5% by weight, for example, 0.05 to 0.2% by weight, based on the weight of the paper.

The fluorine-containing copolymer of the present invention bonds well to the substrate, particularly to paper.

The paper can be manufactured by conventional paper manufacturing methods. There can be used an internal addition method wherein the treatment agent is added to pulp slurry before manufacturing the paper, and an external addition method wherein the treatment agent is added to a manufactured paper. Arbitrarily, after a simple drying at room temperature or a high temperature, the use of a heat treatment capable of having the temperature of at most 300° C., for example, at most 200° C., particularly 80 to 180° C., depending on the properties of the substrate can exhibit excellent lipophobicity and hydrophobicity.

The present invention can be used for base paper for gypsum board, coating base paper, medium grade paper, ordinary liner and core, pure white neutral roll paper, neutral liner, rust-preventive liner, metal composite paper and kraft paper. The present invention can be used also for neutral printing or writing paper, neutral coating base paper, neutral PPC paper, neutral thermosensible paper, neutral pressure-sensitive paper, neutral ink jet paper, and neutral communication paper.

As a pulp raw material, there may be used any of bleached pulp or unbleached chemical pulp such as kraft pulp or sulfite pulp, bleached or unbleached high yield pulp such as chip pulp, mechanical pulp or thermomechanical pulp, and waste paper pulp of news paper, journals, corrugated board and ink-removed paper. Also, a mixture of the above pulp raw material with synthetic fibers such as asbestos, polyamide, polyimide, polyester, polyolefin or polyvinyl alcohol may be used.

The water resistance of paper can be improved by adding a sizing agent to the paper. Examples of the sizing agent are a cationic sizing agent, an anionic sizing agent, and a rosin-based sizing agent (e.g., acidic rosin-based sizing agent, or neutral rosin-based sizing agent). A styrene-acrylic acid copolymer and an alkylketene dimer are preferred. The amount of the sizing agent may be 0.01 to 5% by weight based on the weight of the pulp.

If needed, the paper may contain additives conventionally used in papermaking, for example, a paper strength-enhancing agent such as starch, modified starch, carboxyl methyl cellulose or polyimide-polyamine-epichlorohydrin resin, a yield-improving agent, a dye, a fluorescent dye, a slime-controlling agent, and a defoaming agent.

If needed, a size press, gate roll coater, bill blade coater, calender or the like may be used to apply the chemicals (e.g., the treatment agent, starch, polyvinyl alcohol, dye, coating color, or slide-preventive agent) to paper.

In the present invention, an article to be treated is treated with a treatment agent. The "treatment" means that a treatment agent is applied to a substrate by immersion, spraying, coating or the like. The treatment gives the result that the fluorine-containing copolymer which is an active component of the treatment agent is penetrated into the internal parts of the substrate and/or adhered to surfaces of the substrate.

The fluorine-containing copolymer of the present invention can form a film as cosmetics. The composition comprising the fluorine-containing copolymer, particularly the composition comprising the fluorine-containing copolymer and water and/or an organic solvent is applied to a human body, particularly to a skin or a nail, and the liquid medium is removed by drying to give a film.

The fluorine-containing copolymer of the present invention can be used for shaping as a mold release agent. The mold release agent is an internal mold release agent or an external mold release agent. For example, the shaping can be made by applying the mold release agent to an inside of a mold, subsequently filing molding materials in the mold, and solidifying the molding materials.

EXAMPLES

Hereinafter, the present invention will be described in more detail by way of Examples. The following Examples are specifically illustrated but are not to be construed to limit the scope of the invention. Throughout Examples, "parts" and "%" are "parts by weight" and "% by weight", unless otherwise specified.

The testing method used is as follows.
Oil Resistance (Kit)

The oil resistance (kit method) was measured according to the TAPPI T-559 cm-02 method. A kit test liquid is a test liquid wherein a caster oil, toluene and n-heptane are mixed in ratios shown in Table 1. One drop of the test liquid shown in Table 1 is placed on a paper, then, the infiltration state of the liquid is observed after 15 seconds. A maximum point of oil resistance given by the kit test liquid having no infiltration is assigned to be an oil resistance of the paper. The higher the kit test liquid number is, the higher the oil resistance is.

TABLE 1

| Oil resistance (Kit test liquid) | Mixing ratio (vol %) | | |
|---|---|---|---|
| | Castor oil | Toluene | Heptane |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |
| 6 | 50 | 25 | 25 |
| 7 | 40 | 30 | 30 |
| 8 | 30 | 35 | 35 |
| 9 | 20 | 40 | 40 |
| 10 | 10 | 45 | 45 |

TABLE 1-continued

| Oil resistance (Kit test liquid) | Mixing ratio (vol %) | | |
|---|---|---|---|
| | Castor oil | Toluene | Heptane |
| 11 | 0 | 45 | 55 |
| 12 | 0 | 50 | 50 |

Water Resistance (Stoeckigt Sizing Degree)

The water resistance is measured according to JIS P8122. The longer the time (unit: second) is, the higher the water resistance is.

Polymers were produced as follows:

Example 1

Into a 200 ml four-necked flask equipped with a reflux condenser, a nitrogen introduction tube, a thermometer and a stirring device, charged were a fluorine-containing monomer: $CH_2=CHC(=O)O-CH_2CH_2C_6F_{13}$ (hereinafter referred to as "C6SFA") (38.5 g), dimethylaminoethyl methacrylate: $CH_2=C(CH_3)C(=O)O-CH_2CH_2N(CH_3)_2$ (hereinafter referred to as "DM") (7.5 g), N-vinyl pyrrolidone (hereinafter referred to as "NVP") (4 g) and methyl ethyl ketone (hereinafter referred to as "MEK") (50 g). Nitrogen bubbling was done for 30 minutes. After increase of an internal temperature to 50-60° C., PERBUTYL PV (0.7 g) was added and the polymerization reaction was conducted at 60° C. for 6 hours. A monomer composition of the resultant polymer was almost the same as the charged monomers.

MEK was removed from the resultant solution by heating the solution under reduced pressure at about 60-70° C. to give a pale yellow polymer residue. Water (122 g) and acetic acid (2.9 g) were added to the polymer residue, and the internal temperature was kept at about 75° C. for at least 1 hour. 1% aqueous $H_2O_2$ solution (25 g) was added, and the internal temperature was kept at about 75° C. for at least 1 hour and then cooled to give an aqueous dispersion of copolymer having a solid content of 25% by weight.

Example 2

The same polymerization reaction as in Example 1 was repeated except that C6SFA (38.5 g), DM (6.5 g), NVP (4 g), methacrylic acid (1 g) and MEK (50 g) were charged. A monomer composition of the resultant polymer was almost the same as the charged monomers.

MEK was removed from the resultant solution by heating the solution under reduced pressure at about 60-70° C. to give a polymer residue. Water (122.4 g) and acetic acid (2.5 g) were added to the polymer residue, and the same procedure as in Example 1 was repeated to give an aqueous dispersion of copolymer having a solid content of 25% by weight.

Example 3

The same polymerization reaction as in Example 1 was repeated except that C6SFA (36 g), DM (7.5 g), NVP (6.5 g) and MEK (50 g) were charged. A monomer composition of the resultant polymer was almost the same as the charged monomers. The same procedure as in Example 1 was repeated to give an aqueous dispersion of copolymer having a solid content of 25% by weight.

Example 4

The same polymerization reaction as in Example 1 was repeated except that C6SFA (38.5 g), DM (7.5 g), NVP (4 g)

and MEK (50 g) were charged. A monomer composition of the resultant polymer was almost the same as the charged monomers. Then, MEK was removed from the resultant solution by heating the solution under reduced pressure at about 60-70° C. to give a polymer residue. Water (147 g) and acetic acid (2.9 g) were added to the polymer residue, and the internal temperature was kept at about 75° C. for at least 1 hour and then cooled to give an aqueous dispersion of copolymer having a solid content of 25% by weight.

Example 5

The same polymerization reaction as in Example 1 was repeated except that C6SFA (38.5 g), DM (5 g), NVP (6.5 g) and MEK (50 g) were charged. A monomer composition of the resultant polymer was almost the same as the charged monomers. Then, water (149 g) and acetic acid (1.4 g) were added, and MEK was evaporated off by keeping the internal temperature at about 70° C. under reduced pressure and then cooled to give an aqueous dispersion of copolymer having a solid content of 25% by weight.

Comparative Example 1

The same polymerization reaction as in Example 1 was repeated except that C6SFA (41.5 g), DM (7.5 g), methacrylic acid (1 g) and MEK (50 g) were charged. A monomer composition of the resultant polymer was almost the same as the charged monomers. The same procedure as in Example 1 was repeated to give an aqueous dispersion of copolymer having a solid content of 25% by weight.

Comparative Example 2

The same polymerization reaction as in Example 1 was repeated except that C6SFA (42.5 g), DM (7.5 g) and MEK (50 g) were charged. A monomer composition of the resultant polymer was almost the same as the charged monomers. The same procedure as in Example 1 was repeated to give an aqueous dispersion of copolymer having a solid content of 25% by weight.

Comparative Example 3

The same polymerization reaction as in Example 1 was repeated except that C6SFA (36 g), DM (7.5 g), polyethylene glycol acrylate: $CH_2=CHC(=O)O-(CH_2CH_2O)_n-H$ (BLEMMER AE90, manufactured by NOF Corporation, average of n is 2, hereinafter referred to as "AE90") (6.5 g) and MEK (50 g) were charged. A monomer composition of the resultant polymer was almost the same as the charged monomers. The same procedure as in Example 1 was repeated to give an aqueous dispersion of copolymer having a solid content of 25% by weight.

Comparative Example 4

The same polymerization reaction as in Example 1 was repeated except that $C_nF_{2n+1}CH_2CH_2OCOCH=CH_2$ (a mixture of compounds wherein n is 6, 8, 10, 12 and 14 (average of n is 8), hereinafter referred to as "C8SFA") (38.5 g), DM (7.5 g), NVP (4 g) and MEK (50 g) were charged. A monomer composition of the resultant polymer was almost the same as the charged monomers. Then, water (148 g) and acetic acid (2.2 g) were added, and MEK was evaporated off by keeping the internal temperature at about 60-70° C. under reduced pressure and then cooled to give an aqueous dispersion of copolymer having a solid content of 25% by weight.

Comparative Example 5

The same polymerization reaction as in Example 1 was repeated except that C6SFA (38.5 g), DM (5 g), cyclohexyl methacrylate (hereinafter referred to as "CHMA") (6.5 g) and MEK (50 g) were charged. A monomer composition of the resultant polymer was almost the same as the charged monomers. Then, water (149 g) and acetic acid (1.4 g) were added, and MEK was evaporated off by keeping the internal temperature at about 60-70° C. under reduced pressure and then cooled to give an aqueous dispersion of copolymer having a solid content of 25% by weight.

TABLE 2

| Monomer composition | Ex. 1 | Ex. 2 | Ex. 3 | Ex. 4 | Ex. 5 |
| --- | --- | --- | --- | --- | --- |
| C8SFA | 0 | 0 | 0 | 0 | 0 |
| C6SFA | 77 | 77 | 72 | 77 | 77 |
| DM | 15 | 13 | 15 | 15 | 10 |
| NVP | 8 | 8 | 13 | 8 | 13 |
| Methacrylic acid | 0 | 2 | 0 | 0 | 0 |
| AE90 | 0 | 0 | 0 | 0 | 0 |
| CHMA | 0 | 0 | 0 | 0 | 0 |

TABLE 3

| Monomer composition | Com. Ex. 1 | Com. Ex. 2 | Com. Ex. 3 | Com. Ex. 4 | Com. Ex. 5 |
| --- | --- | --- | --- | --- | --- |
| C8SFA | 0 | 0 | 0 | 77 | 0 |
| C6SFA | 83 | 85 | 72 | 0 | 77 |
| DM | 15 | 15 | 15 | 15 | 10 |
| NVP | 0 | 0 | 0 | 8 | 0 |
| Methacrylic acid | 2 | 0 | 0 | 0 | 0 |
| AE90 | 0 | 0 | 13 | 0 | 0 |
| CHMA | 0 | 0 | 0 | 0 | 13 |

Application Example 1

(1) Internal Application Process 1

An aqueous dispersion (220 g) containing a 2 wt % mixture of 40 parts of a beaten LBKP (Leaf Bleached Kraft Pulp) and 60 parts of a beaten NBKP (Needle Bleached Kraft Pulp) having a freeness of 450 ml (Canadian Standard Freeness) was stirred in a flask, then 1.09 g of an aqueous solution containing 1 wt % of polyamidoamine-epichlorohydrin (WS-4020 produced by Japan PMC Co., Ltd., a paper strengthening agent in wet condition) was added and the stirring was continued for 1 minute. Then 1.09 g of a diluted aqueous dispersion of copolymer by diluting each of the aqueous dispersion of Examples 1, 2, 3, and 4 and Comparative Examples 1, 2 and 3 with water to a solid content of 1 wt % was added and the stirring was continued for 1 minute.

The resultant pulp slurry was made into paper with a standard hand papermaking machine described in JIS P8222 (The hand papermaking machine was modified to give a paper having a size of 25 cm×25 cm). The resultant wet paper was pressed between filter paper sheets under a pressure of 3.5 kg/cm$^2$ so as to sufficiently absorb water contained in the wet paper. The wet paper was dried over a drum drier (115° C.×70 seconds) to give a water and oil resistant paper. The basis weight of the resultant paper was 70 g/m². The oil resistance and the water resistance of this hand sheet paper were evaluated. The results are shown in the followings.

TABLE 4

|  | Ex. 1 | Ex. 2 | Ex. 3 | Ex. 4 | Com. Ex. 1 | Com. Ex. 2 | Com. Ex. 3 |
| --- | --- | --- | --- | --- | --- | --- | --- |
| Kit | 5 | 5 | 5 | 5 | 1 | 4 | 5 |
| Stoeckigt sizing degree | 18 | 17 | 20 | 15 | 1 | 3 | 10 |

(2) Internal Application Process 2

The same procedure as in Internal application process 1 was repeated except using 1.31 g of a diluted liquid prepared by diluting each aqueous dispersion of copolymer in Examples 4 and 5 and Comparative Examples 4 and 5 to a solid content of 1% with water. The basis weight of the resultant paper was 70 g/m². The oil resistance and the water resistance of this hand sheet paper were evaluated. The results are shown in the followings.

TABLE 5

|  | Ex. 4 | Ex. 5 | Com. Ex. 4 | Com. Ex. 5 |
| --- | --- | --- | --- | --- |
| Kit | 7.5 | 7 | 5 | 4.5 |
| Stoeckigt sizing degree | 33 | 31 | 19 | 15 |

(3) External Application Process

Preparation of Test Paper

Test paper was made by using a test paper machine residing in Western Michigan University in USA.

Production method is shown below.

The kind of pulp used was LBKP (broad-leaved tree bleached kraft pulp) and NBKP (narrow-leaved tree bleached kraft pulp) wherein a ratio was 6/4 (L/N) and a freeness of the used pulp was 400 ml (Canadian Standard Freeness).

Cationized starch, Stayloc 400 (manufactured by Tate and Lyle PLC) in the amount of 2% by weight based on dry pulp was added to a pulp slurry having a pulp content of about 2% by weight. In addition, a sizing agent, Hercon 70 (manufactured by Hercules Corporation) in the amount of 0.0375% by weight based on dry pulp was added to the pulp slurry. The pulp slurry was used to manufacture paper by a Fourdrinier paper machine.

The resultant paper had a basis weight of 60 g/m² and a thickness of 0.01 mm.

An aqueous solution of starch was prepared as follows:

Starch (2-hydorxyethyl starch ether) (Penford Gum 260 manufactured by Penford Products Co.) (8 g) was added to water (92 g), and then the temperature was increased to about 80-90° C. which was kept for about 30 minutes. Then the mixture was cooled to give a 8% aqueous solution of starch.

An aqueous solution (20 g) prepared by diluting, with water, the dispersion of copolymer in Example 4 to a solid content of 1%, the above-mentioned 8% starch solution (18.75 g) and water (61.25 g) were mixed to give an external application treatment liquid. A treatment liquid consisting of 8% starch aqueous solution (18.75 g) and water (81.25 g) was prepared in the same manner as in the above. After the paper was immersed in the treatment liquid, the paper was squeezed at a squeeze pressure of 0.1 kg/cm² by a squeeze machine, and the paper was dried with a drum-type dryer at 115° C. for 70 seconds. Oil resistance and water resistance of this oil-resistant paper-resistant were evaluated. The results of the tests are shown in the followings.

TABLE 6

|  |  | Treatment liquid No. | |
| --- | --- | --- | --- |
|  |  | 1 | 2 |
| Treatment liquid preparation | 1 wt % aqueous solution of Ex. 4 | 0 g | 20 g |
|  | 8% aqueous starch solution | 18.75 g | 18.75 g |
|  | Water | 81.25 g | 61.25 g |
| kit (Oil resistance) |  | 0 | 8 |
| Stoeckigt sizing degree (Water resistance) |  | at most 10 | 47 |

The copolymer of the present invention can be used also for the external application process.

(4) Stability Improvement of Aqueous Copolymer Dispersion by Additive

The stability of the aqueous dispersion of copolymer prepared in Example 4 was improved by adding the below-mentioned additive to the aqueous dispersion of copolymer.

TABLE 7

| Experiment No. | 1 | 2 | 3 | 4 | 5 |
| --- | --- | --- | --- | --- | --- |
| Aqueous dispersion of Ex. 4 (Solid content: 25 wt %) | 30 g | 30 g | 30 g | 30 g | 30 g |
| Additive | Water | DPM | NMP | 3-Methoxy-3-methyl-1-butanol | Isoprene glycol |
| Addition amount | 0 g or 0.3 g or 0.9 g | 0.3 g | 0.3 g | 0.9 g | 0.9 g |
| Determination of stability | Poor | Good | Good | Good | Good |

Method for Determination of Stability:

A sample of 25 g was put in a sedimentation tube. After 24 hours; when the height of the sediment is at least 3 mm, the stability is poor; and when the height of the sediment is smaller than 3 mm, the stability is good. A schematic drawing of a sedimentation tube is shown in FIG. 1. The sizes of the sedimentation tube were as follows:

Internal diameter A: 2.8 cm

Height B: 11 cm

Height C: 6.5 cm

Height D: 2 cm

Internal diameter E: 0.5 cm

INDUSTRIAL APPLICABILITY

The copolymer of the present invention is useful as an effective component for a paper treatment agent.

The invention claimed is:

1. A composition which is an aqueous dispersion, comprising a fluorine-containing copolymer and water,
wherein the fluorine-containing copolymer comprises
(a) repeating units derived from a fluorine-containing monomer consisting essentially of a compound of the general formula:

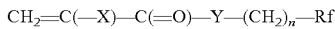  (I)

wherein X is a hydrogen atom;
Y is —O— or —NH—;
Rf is a fluoroalkyl group having 1 to 6 carbon atoms;
n is from 0 to 10;
(b) repeating units derived from at least one amino-monomer of the general formula:

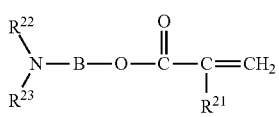  (II-1)

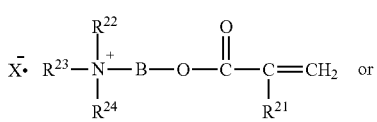  (II-2)

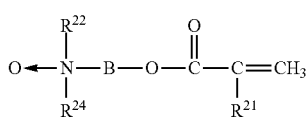  (II-3)

wherein B is a linear or branch alkylene group having 1 to 4 carbon atoms,
$R^{21}$ is a hydrogen atom or an alkyl group having 1 to 4 carbon atoms,
$R^{22}$, $R^{23}$ and $R^{24}$ each is, the same or different, a hydrogen atom, a linear or branched alkyl group having 1 to 18 carbon atoms, or a hydroxyethyl group or a benzyl group, or $R^{22}$ and $R^{23}$ are taken together to form a divalent organic group having 2 to 30 carbon atoms, and
$X^-$ is an anion group; and
(c) repeating units derived from a pyrrolidone monomer of the general formula:

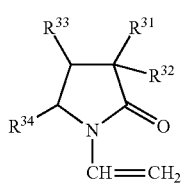  (III)

wherein $R^{31}$, $R^{32}$, $R^{33}$ and $R^{34}$ each is, the same or different, a hydrogen atom or an alkyl group having 1 to 4 carbon atoms,
wherein the amount of the amino-monomer (b) is 10 to 25 parts by weight, and the amount of the pyrrolidone monomer (c) is 0.1 to 30 parts by weight, based on 100 parts by weight of the fluorine-containing monomer (a).

2. A method of preparing the composition according to claim 1, comprising steps of:

(1) polymerizing the monomers in an organic solvent to give a solution of a polymer,
(2) removing the organic solvent from the solution of polymer, and adding water,
(3) optionally, adding an acid to convert an amino group in the polymer to an ammonium salt, and
(4) optionally, performing a treatment with an aqueous solution of hydrogen peroxide.

3. A treatment agent for paper comprising the composition according to claim 1.

4. A method of treating paper which comprises applying to paper the treatment agent for paper according to claim 3.

5. Paper treated with the treatment agent for paper according to claim 3.

6. The composition according to claim 1, wherein Rf in the fluorine-containing monomer (a) is a perfluoroalkyl group having 1 to 6 carbon atoms.

7. The composition according to claim 1, wherein the fluorine-containing copolymer consists essentially of the repeating units (a), (b) and (c).

8. The composition according to claim 1, wherein the fluorine-containing copolymer is polymerized by a solution polymerization using an organic solvent or an emulsion polymerization using both of an organic solvent and water, and thereafter the organic solvent is removed and water is added to disperse the polymer in water.

9. A composition which is an aqueous dispersion, comprising a fluorine-containing copolymer and water,
wherein the fluorine-containing copolymer comprises
(a) repeating units derived from a fluorine-containing monomer consisting essentially of a compound of the general formula:

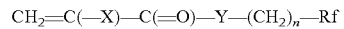  (I)

wherein X is a hydrogen atom;
Y is —O— or —NH—;
Rf is a fluoroalkyl group having 1 to 6 carbon atoms;
n is from 0 to 10;
(b) repeating units derived from at least one amino-monomer of the general formula:

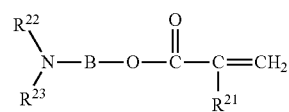  (II-1)

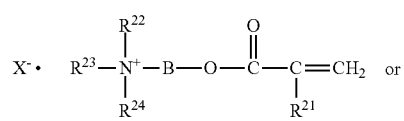  (II-2)

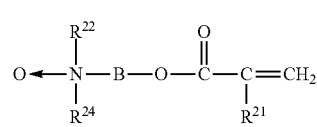  (II-3)

wherein B is a linear or branch alkylene group having 1 to 4 carbon atoms,
$R^{21}$ is a hydrogen atom or an alkyl group having 1 to 4 carbon atoms,
$R^{22}$, $R^{23}$ and $R^{24}$ each is, the same or different, a hydrogen atom, a linear or branched alkyl group having 1 to 18 carbon atoms, or a hydroxyethyl group or a benzyl group, or $R^{22}$ and $R^{23}$ are taken together to form a divalent organic group having 2 to 30 carbon atoms, and $X^-$ is an anion group;

(c) repeating units derived from a pyrrolidone monomer of the general formula:

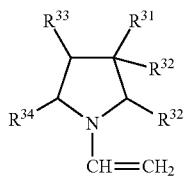

(II)

wherein $R^{31}$, $R^{32}$, $R^{33}$ and $R^{34}$ each is, the same or different, a hydrogen atom or an alkyl group having 1 to 4 carbon atoms, and (d) repeating units derived from an anionic monomer, wherein the amount of the amino-monomer (b) is 10 to 25 parts by weight, and the amount of the pyrrolidone monomer (c) is 0.1 to 30 parts by weight, based on 100 parts by weight of the fluorine-containing monomer (a).

10. The composition according to claim 9, wherein the anionic monomer is methacrylic acid, acrylic acid, sodium styrene sulfonate, itaconic acid, fumaric acid or mixtures thereof.

11. The composition according to claim 9, wherein the amount of the anionic monomer (d) is 1 to 20 parts by weight, based on 100 parts by weight of the fluorine-containing monomer (a).

12. The composition according to claim 9, wherein the fluorine-containing monomer (a) is $CH_2\!=\!CH\!-\!C(\!=\!O)\!-\!O\!-\!(CH_2)_2\!-\!(CF_2)_6F$, the nitrogen-containing monomer (b) is dimethylaminoethyl methacrylate, the pyrrolidone monomer (c) is N-vinyl pyrrolidone, and the anionic monomer (d) is methacrylic acid.

13. The composition according to claim 9, wherein the fluorine-containing copolymer consists essentially of the repeating units (a), (b), (c) and (d).

14. The composition according to claim 9, wherein the fluorine-containing copolymer is polymerized by a solution polymerization using an organic solvent or an emulsion polymerization using both of an organic solvent and water, and thereafter the organic solvent is removed and water is added to disperse the polymer in water.

* * * * *